3,145,086
DIAGNOSTIC COMPOSITION
Alfred H. Free, Elkhart, Ind., and Gary D. Lower, Chicago, Ill., assignors to Miles Laboratories, Inc., Elkhart, Ind., a corporation of Indiana
No Drawing. Filed May 5, 1960, Ser. No. 26,953
14 Claims. (Cl. 23—253)

This invention relates to new and improved diagnostic compositions. More particularly, the invention relates to diagnostic compositions which are useful for the qualitative detection and quantitative determination of urea in body fluids such as urine, plasma, blood, and the like.

It is well known in the art that the blood urea level in individuals varies within certain limits. It has been found that the acceptable range of blood urea level may vary in normal human beings from about 15 mg. to about 40 mg. of urea per 100 ml. of blood (e.g., 15 mg. percent to 40 mg. percent of urea). When the blood urea level falls below the lower limit of this normal range or is in excess of the upper limit of the range, it is an indication of the possible presence of some abnormal condition. Since a normal blood urea level exists, it is desirable that a test be found which indicates clearly when the blood urea level is outside the normal range. The instant diagnostic test is directed towards the determination of abnormally high blood urea.

This detection and estimation of urea in body fluids as by the determination of its concentration therein is of great importance for patients with a known kidney dysfunction. Such patients must consequently control their diets or otherwise regulate their protein metabolism and must frequently be guided in this regard by a regular check on the concentration of their blood urea. However, urea may accumulate in the blood and other body fluids in various other well recognized disturbances of the body metabolism, and in all such cases it is important to carry out tests for the detection of excessive quantities of urea. But beyond its usefulness in regular testing on known kidney dysfunction by both patients and physicians, this urea indicator may also be used efficiently in route urea analyses of body fluids in hospitals and physicians' offices.

Because early diagnosis and continued control are so important in the determination of kidney dysfunction, a test for detecting the presence of an excess of urea in body fluids, to be of greatest value, must be conveniently rapid, reliable, simple enough for the technician to learn with ease, accurate enough to serve the clinician, and sensitive enough to reflect variations in the patient's condition. Moreover, the reagent composition must be adequately stable.

It is one of the primary objects of the present invention to provide an improved diagnostic composition in a stable dry form and preferably as a diagnostic cellulose strip or stick test which can be used by an unskilled person to give a qualitative test and a quantitative estimation of the presence of an excess of urea in body fluids such as blood. This test can be used even when the quantity of body fluid available is very limited, a drop of blood as from a finger prick being sufficient to effect the present test.

Procedures for the detection of urea in various body fluids are well known in clinical chemistry. One such procedure utilizes chemical hydrolysis and requires special apparatus not always available in a routine laboratory. Another procedure employs a direct colorimetric reaction of urea in a protein-free filtrate with an organic reagent such as diacetyl monoxime. Still another involves a test which depends on the action of the enzyme urease to convert urea to an ammonium salt which is measured by titration or nesslerization.

These prior procedures have the disadvantage that they all require a considerable amount of skill and familiarity with complicated laboratory techniques.

We have now found a novel and highly useful urea-detecting means which represents an important improvement in the area of determining urea concentration in various materials including body fluids, such as blood, plasma, etc. This technique utilizes a diagnostic composition preferably impregnated on a cellulose strip, and more particularly a composition which in addition includes ingredients which result in the production of a reliable diagnostic composition which is simple, rapid, and more convenient than any heretofore used and is free of the many disadvantages which characterized prior compositions, tests and procedures.

Specifically, we have now found a unique combination of a urease system with an indicator system which offers a superior means for testing biological fluids for their urea content. This unique combination comprises an enzyme system having urease activity, a buffer, an indicator material which is capable of changing color in the presence of a pH change and preferably an agent to facilitate the suspension and distribution of the enzyme throughout the mixture. In a preferred embodiment bibulous cellulose strips are impregnated with this composition and then dried. This product represents an important improvement in more accurately determining the quantity of urea in a specimen. When the test area of this test strip is smeared with a drop of blood, for determining the blood urea present, the enzyme system having urease activity hydrolyzes the urea present to form a reaction product (ammonium carbonate) which is more alkaline than the urea originally present. By varying the amounts of buffer in a test composition the quantity of reaction product (ammonium carbonate) formed will cause varying increments of pH increase. Thus critical adjustment of the amount of buffer used will result in indicator color changes which are an index of the amount of reaction product formed and therefore of the amount of urea originally present in the test sample. With this unique combination, urea present in a test specimen is indicated by the formation, in a test strip contacted with the specimen, of a clearly perceptible color change in the indicator which may be correlated with the urea concentration present in the test specimen.

When phenol red is the indicating material, urea present in the original test specimen can effect a color change from yellow to red. By adjusting the amount of buffer used the indicator undergoes a color change at correspondingly different urea levels giving a clear visible index of the urea concentration present in the original test specimen and thus allows a simple, quick and accurate determination of the concentration or the range of the concentration of urea present in the tested sample.

The principles underlying the basic reactions of enzyme tests for urea are well known. Urease catalyzes the hydrolysis of urea to produce ammonium carbonate. In this reaction urea and water react to form the ammonium salt. This reaction may be represented by the following equation:

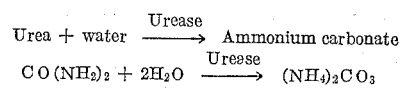

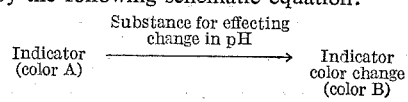

A substance such as urease is effective to carry out the necessary reaction and the product, in turn, is capable of inducing a color change in a class of indicators because of the pH change effected in the conversion of urea to ammonium carbonate. This color change may be represented by the following schematic equation:

Indicator (color A) $\xrightarrow{\text{Substance for effecting change in pH}}$ Indicator color change (color B)

Using, as an example, materials known to the art, urease, phenol red and a phosphate buffer the reaction proceeds as follows:

The urease hydrolyzes the urea present in the material being tested and there is formed, as indicated above, ammonium carbonate. The ammonium carbonate formed in this reaction is more alkaline than the urea. By having different amounts of buffer present in the composition in the test areas a given quantity of ammonium carbonate will cause varying increments of pH increase. Critical adjustment of buffer quantities in turn will give indicator color changes making possible a semi-quantitative measurement of the amount of ammonium carbonate formed and therefore of the amount of urea present in the original test sample.

The present diagnostic test embodies the use of an enzyme system having urease activity, a phosphate or similar buffer, an indicator material which changes color in the presence of a pH change, and a material or materials capable of stabilizing the mixture. This mixture is used to impregnate bibulous cellulose strips which are dried, after which they are ready for use in tests for the determination of urea in blood or similar body fluids.

In the instant invention the cellulose test strips are prepared in a manner which results in a highly stabilized composition. When phenol red is present as the indicator material, adjustment of the buffer content makes possible the production of a pure unblended red color in the presence of a predetermined concentration of urea, a color which is easily read from the strip and any variation in color development is visually distinguishable. These distinguishable colors form a clear visible index, particularly on test strips having multiple sections coated with varying compositions (see Example 3), for determining the urea concentration present within predetermined ranges in the original fluid tested and thus allow a simple determination of the concentration of urea present in the tested sample.

The invention is illustrated in greater detail, but not limited, by the following examples:

EXAMPLE 1

*Single-Area Cellulose Strip—Phosphate Buffer*

A phosphate buffer of 0.2 mol. and having a pH of 6.6 is first prepared by mixing together 28 parts by volume of 0.2 mol. $NaH_2PO_4$ and 22 parts by volume of 0.2 mol. $Na_2HPO_4$. 1.5 gm. of algin and 5.0 gm. of urease are added to 50 ml. of the above 0.2 mol. phosphate buffer. This suspension is spread on the lower 1 inch of stiff cellulose strips and allowed to set for 1 minute. Any excess nonadhering portions of this suspension are then wiped away. The strips are then dipped into a 0.1% aqueous solution of phenol red and are dried in an oven at 90° C. for 45 minutes. The strips are then dipped in a 4% solution of ethyl cellulose in acetone and allowed to air dry for 30 minutes. This ethyl cellulose coating acts as a dialyzing membrane, letting urea through but keeping the large molecules of hemoglobin out of contact with the cellulose strip. As a result the staining properties of hemoglobin on cellulose and the confusing red color resulting therefrom are avoided. This ethyl cellulose layer also facilitates the washing or wiping off of the blood specimen from the cellulose test strip. These strips are conveniently stored in a brown bottle. When one of these strips is moistened with a drop of blood and the blood washed off 1 minute later it is possible to determine whether the blood urea level is 100 mg. percent or more, or less than 100 mg. percent. If the blood specimen tested has a urea concentration of 100 mg. percent or more the test strip will have a red color whereas if the blood specimen has less than 100 mg. percent of urea the color of the test strip will be yellow or orange.

EXAMPLE 2

*Two-Area Cellulose Strip—Phosphate Buffer*

The lower end of a cellulose test strip is divided into upper and lower test areas by forming two narrow barrier bands of water impervious resin about a strip width apart and transversely across the strip. This is done by impregnating the strip along these narrow band areas with a solution of ethyl cellulose in acetone and evaporating the acetone. The upper area is treated with urease, buffer and algin in exactly the same manner as described in Example 1. The lower area is treated with an impregnating mixture containing a 0.1 mol. phosphate buffer of pH 6.6 with the other constituents at the same concentration as described in Example 1. The 0.1 mol. phosphate buffer of pH approximately 6.6 is prepared by taking one part of the 0.2 mol. phosphate buffer of Example 1 and adding one part of distilled water. 50 ml. of this 0.1 mol. phosphate buffer is used to make up the test composition spread on the lower test area of the cellulose strip. After treatment of both areas with their particular buffer-ureas-algin composition the strip is then dipped in phenol red and dried and thereafter coated with a thin dialyzing layer of ethyl cellulose in the same manner as in Example 1. When this stick is moistened with a drop of blood so that both impregnated areas are covered and the blood washed off 1 minute later it is possible to recognize three ranges of blood urea concentration as follows:

Upper and lower areas yellow
    Blood urea less than 50 mg. percent
Upper area yellow; lower area red
    Blood urea 50 mg. percent or more but less than 100 mg. percent
Upper and lower areas red
    Blood urea 100 mg. percent or more

EXAMPLE 3

*Three-Area Cellulose Strip—Phosphate Buffer*

Three narrow barrier bands of ethyl cellulose are formed on the lower end of a cellulose test strip by using the method described in Example 2. This provides three test areas for impregnation with different urea test compositions.

The lower and middle areas are treated in exactly the same way as the two-area strip described in Example 2. The upper area is treated with an impregnating mixture in which the phosphate buffer is 0.4 mol. and has a pH of 5.5 with other constituents at the same concentration as described in Example 1. After treatment of all three areas with their particular buffer-ureas-algin composition, the strip is then dipped in phenol red and dried and coated with a thin dialyzing layer of ethyl cellulose in the same manner as Example 1. When this stick is moistened with a drop of blood so that all three impregnated areas are covered and the blood washed off 1 minute later, it is possible to recognize four ranges of blood urea concentrations as follows:

Upper, middle and lower areas yellow blood urea less than 50 mg. percent
Upper, middle areas yellow; lower area red blood urea 50 mg. percent or more but less than 100 mg. percent
Upper area yellow; middle, lower areas red blood urea 100% or more but less than 200 mg. percent
Upper, middle, lower areas red blood urea 200 mg. percent or more

EXAMPLE 4

*Single-Area Cellulose Strip—Citrate Buffer*

This stick is made exactly like the single area cellulose strip of Example 1 with the exception of the buffer. Fifty milliliters of a 0.2 mol. citrate buffer (sodium citrate/citric acid) at pH 5.0 is used instead of the phosphate buffer. All other components and methods of making the cellulose test strip are the same as in Example 1. When one of these strips is moistened with a drop of blood and the blood washed off 1 minute later, it is possible to recognize whether the blood urea level is 100 mg. percent or more, or less than 100 mg. percent. If the blood specimen tested has a urea concentration of 100 mg. percent or more the test strip will have a red color whereas if the blood specimen has less than 100 mg. percent of urea the color of the test strip will be yellow or orange.

EXAMPLE 5

Single-Area Cellulose Strip—Bromsulphalein Indicator

This test strip is made exactly as the single area stick in Example 1 with the exception of the indicator. Four percent phenol tetrabromphthalein disodium sulfonate is used as the indicator dye instead of 0.1% phenol red. All other components and methods of making the test strip are the same as in Example 1. When one of these test strips is moistened with a drop of blood and the blood washed off 2 minutes later, it is possible to recognize whether the blood urea level is 200 mg. percent or more, or less than 200 mg. percent. If the blood specimen tested has a urea concentration of 200 mg. percent or more the test strip will have a purple color whereas if the blood specimen has less than 200 mg. percent of urea it will have no color at all.

EXAMPLE 6

Single-Area Cellulose Strip—Citrate Buffer

A trisodium citrate buffer having a pH of about 7.0 to about 7.5 and preferably about 7.2 is first prepared by making up a 0.2 mol. solution of trisodium citrate. 5.0 ml. of this citrate buffer is added, 1 ml. at a time, to 600 mg. of urease and thoroughly mixed to make a paste. 1.0 ml. of a 5% solution of bromsulphalein indicator is added and the mixture is applied to uncut barrier strips with a dropper or the cut strips are individually dipped into the mixture. In either case the strips are dried at room temperature or at any temperature below 100° C. The dry strips are normally uncolored but when moistened with a drop of blood and the blood washed off 1 minute later urea concentrations of 100 mg. percent or more will produce a purple color in the strip, whereas urea concentrations of less than 100 mg. percent will leave the strip uncolored.

Although some of the examples above given disclose the use of a cellulose test strip for the mere indication of the presence or absence of blood urea or only a semi-quantitative estimate of the urea level as falling within a certain range, i.e., 50 mg. percent to 100 mg. percent or 100 mg. percent to 200 mg. percent, closer observation of the indicator test results show distinguishable intermediate color intensity development. Thus blood specimens containing higher urea content produce a deeper color. In the case of Example 3 where the multiple-area sections contain buffers of 0.1 mol., 0.2 mol. and 0.4 mol., it will be found that colors of varying intensity are developed depending in depth of development directly upon the progressively increasing amounts of urea in the blood samples tested and inversely with molar increase of buffers. Such clear and distinguishable indicator color developments are considerably aided by the elimination of the confused color masking usually accompanying the staining of an uncoated strip by hemoglobin and other coloring bodies in the blood sample being tested. Accordingly, when tested or smeared with blood containing little or no urea, the coated strips show no color change. In view of the degrees or intensity of color development, a simple color intensity chart based on the distinct color intensities developed by predetermined urea concentrations may be conveniently prepared for use in testing for blood urea with test strips prepared according to this invention. Comparison with such charts gives a more exact quantitative determination of the blood urea level of a test sample.

The specific examples herein given illustrate certain preferred embodiments of the invention, however a number of variations in the reagent materials are possible. For example any enzyme having urease activity can be used. Likewise it should be understood that a number of other buffer systems are available and are well known in the art. Thus in addition to the phosphate buffer specifically illustrated, a citrate buffer, a hexamate buffer, among others may also be used.

The preferred indicator component of some of the examples is shown to be phenol red. However, various other indicators which can be used include bromsulphalein, nitrazine yellow, meta cresol purple, bromthymol blue, phenol red and bromthymol blue (combined) and bromcresol purple, among others. The specific buffers for these indicators can be prepared in accordance with methods well known in the art.

It is obvious that various molar portions of the buffer substances may be used in the concept of this invention and that compositions may thus be prepared so as to give a positive test at any desired blood urea level. In addition it is to be noted that various additive may also be incorporated in the reagent composition as suitable protective, thickening, and wetting agents as well as inert dyes to impart a uniform color background to the composition.

In summary, this invention pertains to a diagnostic composition for the detection of urea in body fluids, and especially urea in blood, consisting of a bibulous cellulose material in the form of a strip which has been impregnated with a composition comprising an enzyme system having urease activity, an indicator dye material and a buffer. This colorimetric test strip enables the user to evaluate urea levels in such body fluids as blood, ultilizing single or multiple section coated strips for qualitatively and quantitatively determining the urea level in a blood sample. In the test, varying intensities of a single shade or one color are produced. These variations in intensity form a clear visible index of the urea concentration present in the original fluid tested and thus allow a simple chart based on this intensity phenomenon to be conveniently prepared for use in determining the concentration of urea present in the tested sample.

What is claimed is:

1. A composition for detecting urea present in a fluid which comprises a bibulous material containing impregnated therein an enzyme system having urease activity, an indicator material which changes color in the presence of a pH change and a buffer for maintaining the pH of the composition within a predetermined range in the presence of the fluid containing said urea.

2. A composition for detecting urea present in a fluid which comprises a bibulous material containing impregnated therein a mixture which comprises an enzyme system having urease activity, an indicator which undergoes a color reaction caused by an ammonium salt, and a buffer for maintaining the pH of the composition within a predetermined range in the presence of the fluid containing said urea.

3. A composition for detecting urea as defined in claim 2 wherein the components are adherent to an inert solid support material.

4. A composition for detecting urea as defined in claim 2 wherein the components are impregnated on bibulous cellulose strips.

5. A test indicator for detecting concentrations of urea in blood which comprises a bibulous material containing therein a mixture which comprises an enzyme system having urease activity, an indicator which undergoes a color reaction caused by ammonium carbonate, and a buffer for maintaining the pH of the mixture within a predetermined range in the presence of blood containing said urea.

6. A test indicator for detecting concentrations of urea in blood which comprises a bibulous material containing therein a mixture which comprises an enzyme system having urease activity, an indicator which undergoes a color reaction caused by ammonium carbonate, and a buffer for maintaining the pH of the mixture at about 4.0 to about 6.6 in the presence of blood containing said urea.

7. A diagnostic composition for detecting urea present in a fluid which comprises a bibulous material containing impregnated therein urease, a pH indicator, and a buffer for controlling the pH of the composition and the color change of the indicator which undergoes a color reaction caused by ammonium carbonate when the impregnated bibulous material is contacted with urea in the fluid tested, the amount of buffer added to the bibulous material when accompanied by said indicator color change being a directly proportional index of the amount of ammonium carbonate formed and of the amount of urea originally present in the fluid tested.

8. Means for determining urea in liquids comprising a bibulous body carrying an indicator dye, an enzyme having urease activity, a suspension stabilizing colloid and a buffering material effective to maintain said body and dye when contacted with a liquid containing urea at a point adjacent to, but on the acid side of, the pH at which the color change of said dye normally occurs.

9. The means of claim 8 wherein said inidcator dye is phenol red and said buffering material is effective to maintain a pH of about 4.8 to 6.6.

10. A diagnostic composition for detecting urea which comprises a strip of bibulous cellulose material impregnated with urease, a citrate buffer having a pH of about 5.0 and phenol red.

11. A diagnositc composition for detecting urea which comprises a strip of bibulous cellulose material impregnated with urease, a phosphate buffer having a pH of about 5.5 to about 6.6 and phenol red.

12. A diagnostic composition for detecting urea which comprises a strip of bibulous cellulose material impregnated with urease, a phosphate buffer, phenol red, and an algin.

13. A diagnostic composition for detecting urea which comprises a strip of bibulous cellulose material impregnated with urease, a phosphate buffer having a pH of about 6.6 and phenol tetrabromphthalein disodium sulfonate.

14. A diagnostic composition for detecting urea which comprises a strip of bibulous cellulose material impregnated with urease, a citrate buffer having a pH of about 7.0 to about 7.5 and phenol tetrabromphthalein disodium sulfonate.

References Cited in the file of this patent

UNITED STATES PATENTS 2,848,308     Free _____ Aug. 19, 1958

OTHER REFERENCES

Difco Manual, 9th Ed., 1953, published by Difco Laboratories, Detroit, page 170. (Copy in Division 63.)

Tauber, H.: "Chemistry and Technology of Enzymes," 1949, Wiley & Sons, New York, pages 119, 120, 121. (Copy in Division 63 and Scientific Library.)

Mantell, C. L.: "Water-Soluble Gums," 1947, Reinhold Pub. Co., N.Y., pages 116, 117. (Copy in Division 63 and Scientific Library.)